Nov. 19, 1929.  W. K. HACK  1,736,004
IGNITION TESTING DEVICE
Filed Oct. 5, 1925   3 Sheets-Sheet 1

INVENTOR
Walter K. Hack
BY
ATTORNEY

Nov. 19, 1929.　　　W. K. HACK　　　1,736,004
IGNITION TESTING DEVICE
Filed Oct. 5, 1925　　　3 Sheets-Sheet 2
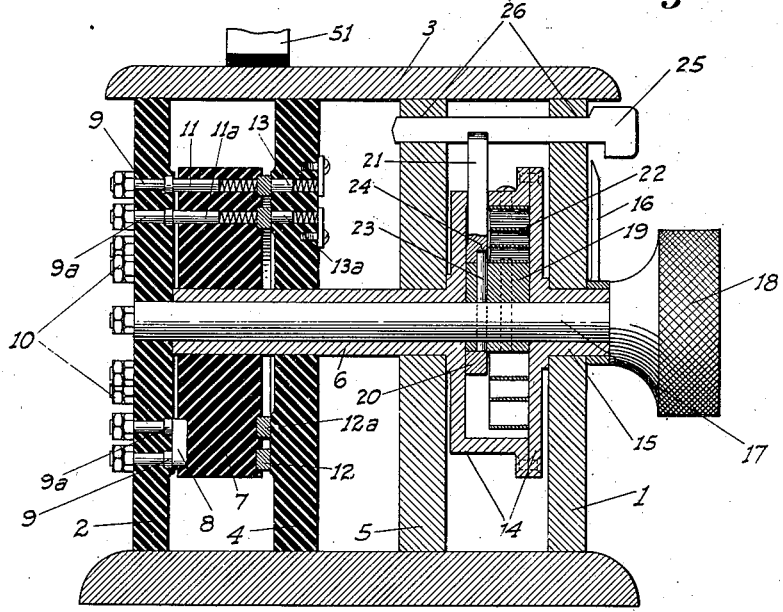
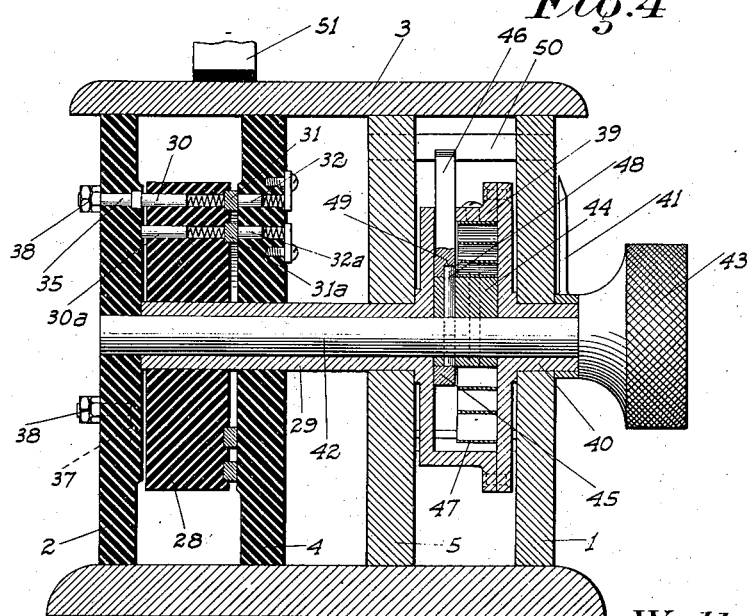
INVENTOR
Walter K. Hack
BY
ATTORNEY

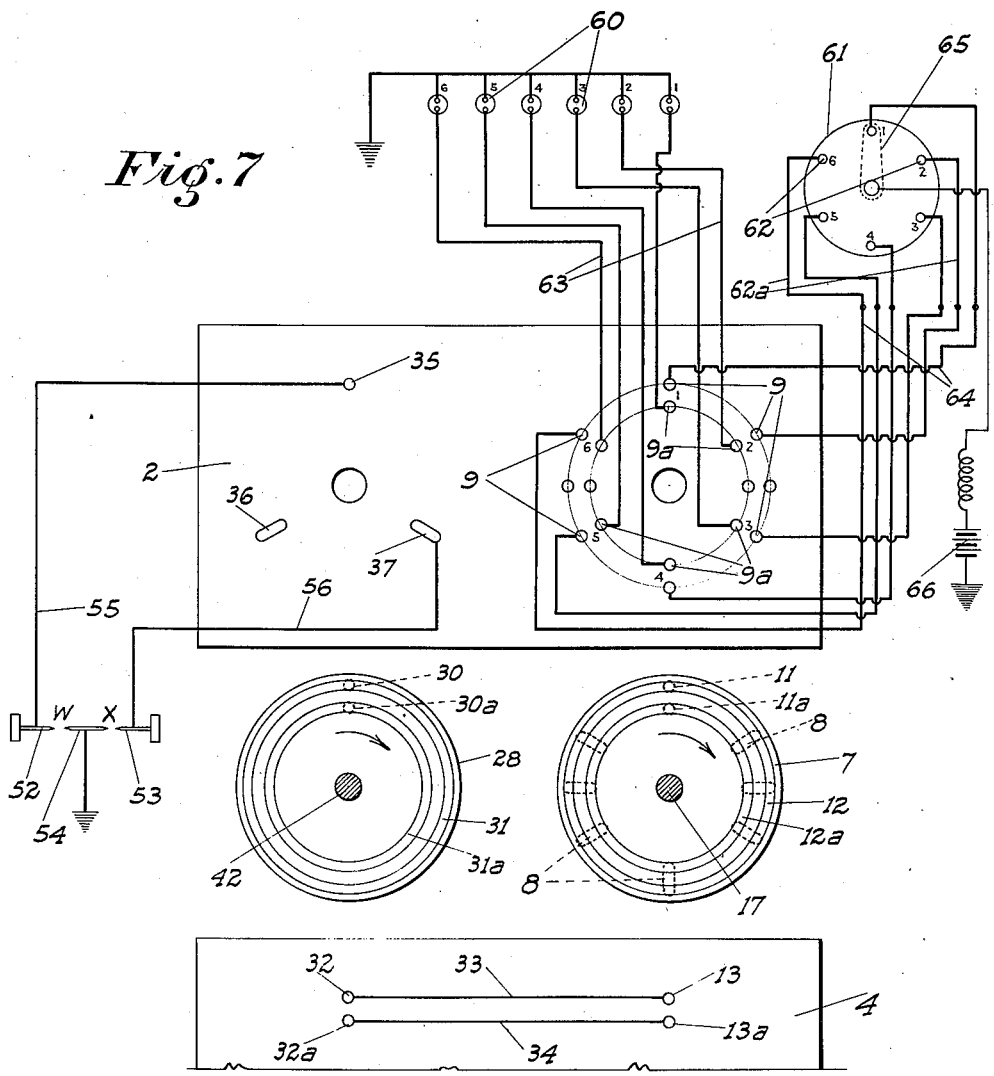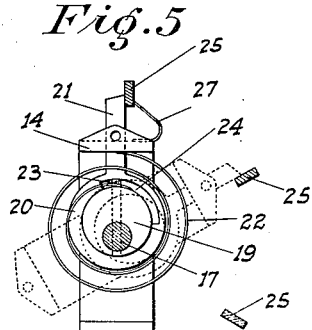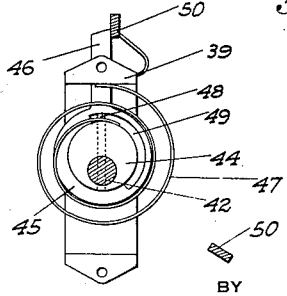

Patented Nov. 19, 1929

1,736,004

UNITED STATES PATENT OFFICE

WALTER K. HACK, OF SANTA CRUZ, CALIFORNIA

IGNITION-TESTING DEVICE

Application filed October 5, 1925. Serial No. 60,450.

This invention relates to ignition testing devices for internal combustion engines, my main object being to provide a device for the purpose by means of which both the condition of any spark plug in the system, and the strength of the current delivered to the plugs, may be accurately and quickly determined. An instruction or trouble chart accompanies each device, arranged so that the results of any test may be readily logged and classified, and further tests then carried out if necessary based on such classification, until the trouble with any plug or in the ignition system is definitely located and the remedy suggested.

A further object of the invention is to provide an ignition testing device arranged to be connected to the system in such a manner that tests are carried out under actual working conditions of the system, and the operation of the engine is not interfered with while the tests are being carried out.

The strength or character of the current delivered to each plug by its individual distributor wire may be separately, conveniently, and accurately tested; and such strength delivered by any one wire may be accurately compared with that delivered by any or all of the other wires. Similarly the condition of any one plug may be ascertained and compared with any or all of the other plugs.

The apparatus is so simple of operation that in connection with the above mentioned chart, any mechanic, even though not an experienced electrician and "trouble shooter" may carry out the tests and locate ignition troubles of any character in a practical, accurate and efficient manner and in a relatively short time.
As above stated, the tests are carried out under actual working conditions, another object of my invention being to construct the device in such a manner that it may be connected to all the distributor wires and spark plugs of the ignition system before commencing to make the tests; and such tests may then be selectively made without disconnecting or connecting any wires after commencing the tests, and with the engine firing in all cylinders but the one whose plug or wiring is being tested at any time.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figs. 1 and 2 are front and top plan views respectively of my testing apparatus, the external wiring being omitted.

Figs. 3 and 4 are cross sections on the lines 3—3 and 4—4 respectively of Fig. 1.

Figs. 5 and 6 are fragmentary views of the movement controlling mechanism for the rotors of the plug and current testing switches respectively.

Fig. 7 is a circuit diagram of the device, shown in connection with the cooperating wiring of the ignition system of an engine.

Figure 1:
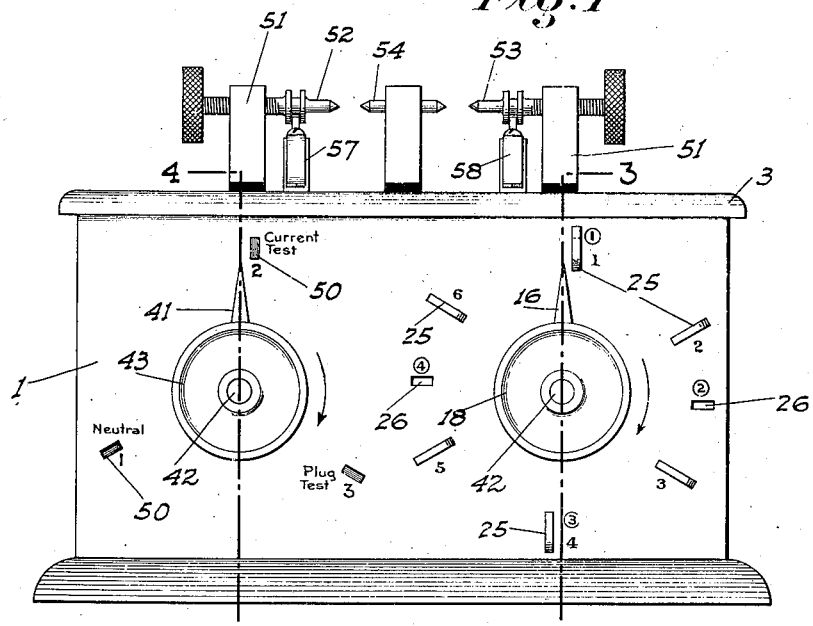

The mechanical features of my device comprise fundamentally two switch mechanisms. One switch is for selecting any particular distributor wire or plug to be tested while the other one enables the operator to test either the current delivered by the distributor wire or to test the plug, as selected by the first switch or to enable the engine to run in a normal manner.

These switches are mounted to form a unit in a cabinet which includes front and rear panels 1 and 2, the latter of insulation material; a top 3; an inner longitudinal panel 4, also of insulation material, and a partition wall 5 between said inner panel and the front panel.

The plug or wire selecting switch is constructed as follows:

A sleeve 6 is journaled in the panel 4 and wall 5, and has fixed thereon, between the panels 2 and 4, a rotor 7 of insulation material. The face of this rotor which is adjacent the panel 2 carries a plurality of radial and concentrically disposed contact strips 8, each adapted to simultaneously engage a similarly arranged but separated pair of contact pins 9 and 9ª mounted in the panel 2. These pins project through to the outside of the panel 2 and are provided on their outer ends with binding posts 10.

The rotor also carries a pair of radially spaced spring pressed brushes 11 and 11ª likewise adapted to engage any pair of the pins 9 and 9ª. The opposite ends of the brushes are electrically connected with contact rings 12 and 12ª mounted in spaced relation on the corresponding face of the rotor. These rings in turn constantly engage spring pressed brushes 13 and 13ª mounted in the panel 4.

A frame structure 14 projects outwardly from the sleeve 6 between the wall 5 and panel 1, said structure having a short sleeve 15 alined with but spaced from the sleeve 6 and projecting through the panel 1. The outer end of the sleeve 15 carries a radial pointer 16.

Turnably mounted in sleeves 6 and 15 and projecting outwardly of the latter is a shaft 17, having an operating knob 18 on its outer end.

Fixed on the shaft between the sleeves 6 and 15 or inside the frame structure is an eccentric 19 on which is turnably mounted a strap 20 carrying a radial arm 21 which slidably projects through the frame to a certain distance therebeyond.

A spiral spring 22 between the eccentric and frame tends to cause the latter to turn in one direction. To prevent complete unwinding or slackening of the spring at all times, regardless of exterior influences, I provide a pin 23 which projects diametrally through the eccentric and shaft, one end of said pin projecting outwardly of the eccentric and riding in an arcuate recess 24 of certain length provided in the strap 20 (see Fig. 5).

The pin 23 therefore not only serves to mount the eccentric on the shaft, but prevents all but a limited extent of movement of the shaft 17 relative to the frame 14, and parts connected thereto, in either direction. The outer end of the arm 21 is normally in the path of and abuts against one side face of one of a plurality of stops or keys 25 removably mounted in slots 26 provided in the panel 1 and wall 5, and extending of course across the space therebetween. A yieldable spring stop 27, mounted on the frame, bears against the opposite face of any key with which the arm 21 is engaged.

It will be noted from a comparison of the rotor and adjacent panel contact arrangement as shown in Fig. 7, with the arrangement of the key slots shown in Fig. 1, that there are the same number of slots as there are pairs of contacts, and that they are similarly arranged as to arcuate spacing. This is to enable the device to be readily used for testing a four-cylinder motor, a six cylinder motor, or any multiples or fractions of such numbers, such as when testing eight or twelve cylinder motors, or motorcycle and boat motors having two or three cylinders.

In the present instance, the device is presumed to be in use in connection with a six cylinder engine, and hence six keys, disposed 60° apart arcuately, are employed, and only a corresponding number of the contacts 9 and 9ª, correspondingly located, are connected to the ignition system as hereinafter set forth. If a four or eight cylinder motor is being tested, then only four keys, set 90° apart, are used, and a corresponding number of contacts, correspondingly located, are wired to the ignition system.

The key-slots are preferably numbered in rotation as shown in Fig. 1, while the contact binding posts 10 are similarly numbered so that connection with the corresponding cylinders of the motor may be made without the possibility of error and confusion.

The keys act as stops for the different positions of setting of the rotor, so that the corresponding pairs of contacts in the panel 2 and rotor 7 will properly register without slow and possibly inaccurate hand adjustment being necessary. Such slow movement would also cause the engine to stop.

The spring 22 is arranged to cause the arm 21 to bear against one of the keys 25 and to shift the position of the arm, and consequently the rotor when the knob 18 is rotated to the right.

The shaft 17 will therefore be turned which will turn the eccentric, the latter being placed so that its high point faces toward the arm. Such rotation therefore causes the arm to be drawn inwardly, and at the same time the spring is being wound up. As soon as the arm is drawn inwardly of the key with which it has been engaged, the spring 22 is free to act, and of course imparts a sudden rotation to the strap 20 and arm 21 toward the next key to the right. As the strap rotates on the then stationary eccentric, the arm is again forced outwardly, so that by the time the next key is reached, the arm is in position to engage the key, of course stopping the movement of the arm and parts associated therewith, which includes the rotor. The contacts 11 and 11ª on the rear face of the latter have therefore moved so as to aline with a pair of the fixed contacts 9 and 9ª on the panel 2 adjacent to those with which said rotor contacts previously alined. The strips 8 have of course also shifted to aline with successive pairs of the contacts 9 and 9ª.

As previously stated, the above described switch is for the purpose of selecting any distributor wire or plug to be tested.

The switch for enabling such selected wire or plug to be tested, while mechanically substantially the same as the current testing switch, has certain vital features of difference.

This switch comprises a rotor 28 mounted between the panels 2 and 4 and wall 5 beyond the other switch.

This rotor carries a single pair of spring pressed and radially spaced brushes 30 and 30ª, which are electrically connected to a pair of spaced collecting rings 31 and 31ª respectively mounted on the opposite face of the rotor.

These rings constantly engage brushes 32 and 32ª respectively mounted in panel 4, which brushes are connected to the brushes 13 and 13ª respectively by wires 33 and 34, (see Fig. 7).

The outer rotor brush 30 is positioned to engage a contact 35 fixed in the panel 2, while both brushes are positioned to simultaneously engage either of a pair of contact strips 36 and 37 mounted in panel 2 in evenly and arcuately spaced relation to contact 35. Contact 35 and strip 37 are provided with binding posts 38 on the outer face of panel 2 so that ready connection with exterior wiring may be made.

The sleeve 29 carries a frame structure 39 located between wall 5 and panel 1, which frame structure has a short sleeve 40 projecting through the panel 1 with an indicating pointer 41 on its outer end. A shaft 42 is turnable in the sleeves 29 and 40, with an operating knob 43 on its outer end. An eccentric 44 is fixed on the shaft 42 between the sleeve 29 and 40, on which eccentric is turnable a strap 45 from which a radial arm 46 slidably projects through the frame. A spiral spring 47 between the eccentric and frame acts to rotate the frame a certain distance.

As was provided in connection with the similar structure of the current testing switch, and for the same purpose, a radial pin 48 is mounted in the eccentric and projects at one end into an arcuate recess 49 in the straps 45 (see Fig. 6).

The outer end of the arm 46 normally lies in the path of and engages one side face of one of a number of keys 50 mounted in wall 5 and panel 1 and extending across the space therebetween.

Unlike the keys 25, the keys 50 are permanently mounted and there are only three of them. They are disposed in evenly and arcuately spaced relation about the shaft 42, such position and spacing being the same as that of the contact 35 and strips 36 and 37.

The rotor 28 is therefore capable of only three different settings, adjusting of the rotor to any setting being had by rotation of the knob 43 with the accompanying movement of the arm 46 and rotor 28 the same as that described in connection with the corresponding structure of the selecting switch.

Mounted on top of the cabinet in spaced brackets 51 insulated from each other are independent and longitudinally adjustable electrodes 52 and 53. The adjacent ends of these electrodes face a common fixed electrode 54, insulated from electrodes 52 and 53. Electrode 52 is connected to the contact 35 by a wire 55, while electrode 53 is connected to strip 37 by a wire 56 (see Fig. 7). Electrode 54 is suitably grounded, as indicated.

These pairs of electrodes form adjustable spark gaps W and X across which a spark from the ignition system of the motor, being tested, may jump, for the purpose hereinafter set forth.

Figure 2:
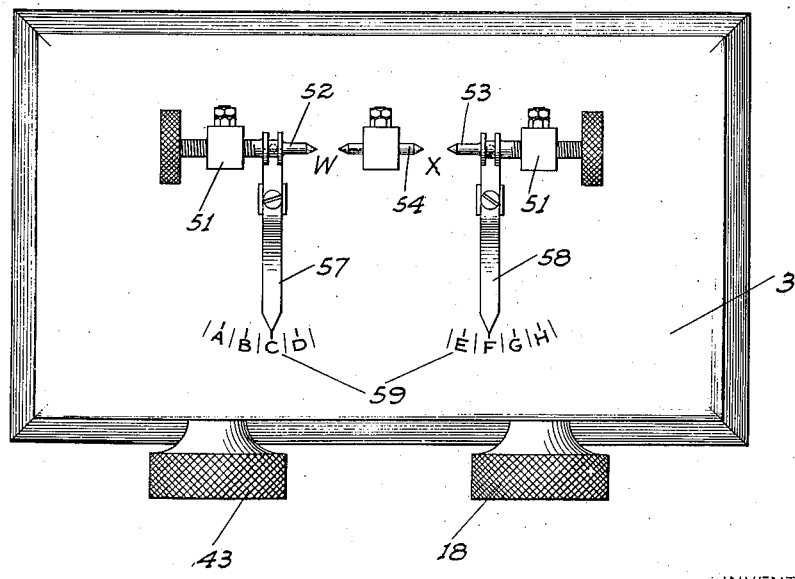

The adjustable electrodes 52 and 53 are connected to pivoted pointers or indicators 57 and 58 respectively arranged to point to arbitrarily designated calibrations or markings on the top of the cabinet, as indicated at 59 in Fig. 2.

Referring to Fig. 7, 60 represents the various spark plugs of a six cylinder engine, and 61 the distributor, the latter having of course a number of contacts 62 corresponding to the plugs. Wires 62ª as usual are operatively connected with contacts 62.

In connecting my device to such members of the ignition system of the engine, I disconnect the distributor wires 62ª from the plugs, and then connect the latter to the inner contacts 9ª in proper numerical order by individual wires 63. The free ends of the distributor wires are then connected to the outer contacts 9 in proper numerical order by wires 64. All current to the plugs must therefore pass through the testing device, and the distributor wires being included in the circuit, any defects in such wires will show up when the tests are made.

The wires 63 and 64 are provided as standard equipment with the apparatus, and are provided at their free ends with suitable clips (not shown) so that connections with the plugs etc. may be readily made. The electrode 54 is also provided with a suitable length of wire, with a clip attached, so that connection with ground may be readily made.

These few simple wiring connections having been made, testing operations may be commenced, the motor being preferably first allowed to run a sufficient length of time to get warmed up, to better provide normal working conditions while making the test.

Assuming that it is desired to test the strength of the current flowing to No. 1 plug, the rotors are set as indicated in Fig. 7. In this position of these members, the brushes 11 and 11ᵃ of the rotor 7 are engaged with that pair of contacts 9 and 9ᵃ which are wired to plug No. 1 and the corresponding distributor contact; while brush 30 of rotor 28 is engaged with contact 35 which is connected to electrode 52. It is of course to be understood that the engine is running while tests are being made so that the distributor arm 65 which is inductively connected with the battery 66 or other source of current through the usual coil will successively engage the various distributor contacts.

When the arm 65 is engaged with contact 62—1, current which ordinarily passes to plug No. 1 will now flow from the battery through arm 65 to contact 62—1, through the corresponding wires 62ᵃ and 64 to the corresponding contact 9, thence to brush 11, ring 12, brush 13, along wire 33 to brush 32, thence to ring 31 and brush 30. There is no way for the current to then pass to ring 31ᵃ which would permit it to flow through wire 34 to ring 12ᵃ and thence through wire 63 leading from No. 1 contact 9ᵃ to plug No. 1. The only path for the current to travel is from brush 30 to contact 35, thence through wire 55 to electrode 52, across the gap W to electrode 54, and thence to ground. The gap W being out in the open, the character and intensity of the spark jumping said gap and ordinarily delivered to plug No. 1, may be observed. By adjusting the electrode 52 so as to alter the width of the gap, which adjustment also alters the setting of the indicator 57 along its graduated scale 59, the width of gap necessary to cause the spark to jump the same may be noted, and the results compared and checked with the notations on the guide chart hereinafter described, and which has been prepared according to previously made and accurately checked tests of all conditions which may be met with.

At the same time, all the other plugs are functioning in the usual manner.

This is because the current may pass direct to said plugs from the distributor arm to the various contacts 62, thence through the respective wires 62ᵃ and 64 to the respective contacts 9, thence across strips 8 to the respective contacts 9ᵃ, and thence along the respective wires 63 to the different plugs.

The motor may therefore be run on five of the six cylinders while the remaining plug is being tested.

If No. 2 plug is to be tested, the rotor 7 is turned by manipulation of the knob 18 to No. 2 position, or so that brushes 11 and 11ᵃ register with those ones of the contacts 9 and 9ᵃ which are connected with plug No. 2 and the corresponding distributor contact. The other plugs in turn may be tested by proper manipulation of the rotor 7, and while any plug is being tested, all the other plugs are functioning normally as above stated.

For all such tests, the position of the rotor 28 is not disturbed from that above given.

If it is desired that the engine shall run on all six cylinders for any reason, the rotor 28 is turned by manipulation of knob 43 to the position marked "Neutral". In this position, brushes 30 and 30ᵃ are engaged with strip 36, which is merely a bridge enabling current to pass from ring 31 to ring 31ᵃ, as will be evident.

With rotor 28 in this position, current otherwise passing to electrode 52 from brush 11 to brush 30 as previously described, now flows from said brush 30 through strip 36 to brush 30ᵃ, thence to ring 31ᵃ, to brush 32ᵃ, along wire 34 to brush 13ᵃ, to ring 12ᵃ, thence to brush 11ᵃ, contact 9ᵃ, and along the corresponding wire 63 to the corresponding plug.

When it is desired to test the condition of the plugs themselves, the rotor 7 is set as before, say to test plug No. 1, while rotor 28 is set so that brushes 30 and 30ᵃ register with strip 37.

The current now may follow two paths. The strip 37 being like strip 36, a bridge between rings 31 and 31ᵃ, the current reaching brush 30 from rotor 7 and brush 11 thereon can flow back to brush 11ᵃ and thence to a plug corresponding to the contact 9ᵃ with which said brush is engaged. Or the current may flow from strip 37 through wire 56 to electrode 53, and across gap X to electrode 54 and ground.

The path taken by the current depends primarily on the condition of the plug itself, the compression of the motor, and the adjustment or width of the gap X. Here again, by adjusting electrode 53, and noting the corresponding setting of its indicator 58 on the scale 59, the conditions obtaining may be compared and checked with the observations on the guide chart.

It will therefore be seen that the condition of the plugs, and the strength of the current delivered thereto, may be tested under actual working conditions.

In operation, the current-strength tests are all carried out first; and any trouble indicated thereby remedied. The plug tests are then carried out.

The symbols on the scales 59 are positioned with respect to the settings of the electrodes so that the indicators when pointing to said symbols denote certain definite conditions in the ignition system.

These conditions are as follows; as indicated by the setting of the indicator 57:

(1) If the spark jumps the gap W when indicator 57 is at C, the spark is normal.

(2) If the gap W has to be adjusted so that the indicator 57 points to position B before the spark will jump the gap W, the spark is weak and unless corrected the operation of the engine cylinder whose plug is being tested will be faulty and insufficient. (3) If the indicator 57 is set to position A before the spark will jump the gap W, the spark is too weak to give service and this cylinder will probably not operate at all. (4) If the spark will jump the gap W when the indicator is adjusted to position D it will indicate a very strong spark and will furnish a satisfactory spark under extreme conditions, such as high compression and so forth. (5) The spark delivered to any of the wires of the distributor may be tested by proper manipulation of the rotor 7.

(6) Should a weak spark indicated at A or B be furnished to all of the cylinders it indicates defective timer points; defects in the battery, switch or feed wires that feed the ignition systems; defective resistance unit; defective condenser, defective ignition coil or defective distributor rotor or main distributor wire. These elements should be tested in the order named by methods usually employed for that purpose, the process being one of elimination. (7) A weak spark A or B, delivered to one or more cylinders with a strong spark C or D delivered to the remaining cylinders, indicates poor, broken, pinched or oil soaked insulation on the high tension wire that delivers the weak spark: dirty or defective distributor head, defective timer caused by high or low cams or a loose or wabbly ignition shaft.

The above cover all defects liable to be encountered in the ignition system independent of the plugs themselves.

For plug troubles, indicated by the setting of the indicator 58, the following rules control:

(8) With indicator 58 set at F, if the spark jumps gap X it indicates that the plug points are not too close together but may be too far apart; the plug has a broken or defective electrode, or the engine has excessive compression, (9) Indicator 58 should now be adjusted to position E. If the spark now jumps the gap X it may be taken as proof that one of the above defects exists. (10) If the spark will not jump the gap X with the indicator set at position F adjust indicator to position G. The spark should now jump the gap X and if it does not the plug points are too close together, or the plug is partially shorted or fouled; the insulation cracked or broken, or the motor has a very poor compression.

(11) If the spark will not jump the gap X when the indicator is at position H, the plug is entirely shorted or fouled, and will fail to function at any time.

The above list of conditions, which of course provide a guide for the operator in order that he may look for and remedy any defects existing in the ignition system, is preferably provided in printed form, in connection with the instrument, and associated with the following guide chart:

| Cylinder to be tested | No. 1 | No. 2 | No. 3 | No. 4 | No. 5 | No. 6 |
|---|---|---|---|---|---|---|
| Position for rotor 7 | 1 | 2 | 3 | 4 | 5 | 6 |

| Rotor 28 position | Spark gap ind. 57 position | Spark gap ind. 58 position | Spark across gap indicates—see paragraph— | No spark across gap indicates—see paragraph— |
|---|---|---|---|---|
| 1 | C | F | A | A. |
| 2 | C, B, A, D | Not functioning. | B, Try position C, Try position C, F | C. D. E. Try position C. |
| 3 | Not functioning. | F, E, G, H | G, H, Try position F, Try position F | Try position G. Try position G. I. J. |

(A) No action at either gap. This position is for starting the motor or for warming it up or trying it out, etc.
(B) Ignition is normal for that cylinder. See condition (1).
(C) Ignition is weak for that cylinder. Try position B. See condition (6).
(D) Ignition is very weak and defective. See condition (6) and (7).
(E) Ignition is inoperative. See condition (3), (6), and (7).
(F) Ignition is strong and effective. See condition (4).
(G) Spark plug is O. K. or its points may be too far apart. See condition (8).
(H) Spark plug points are too far apart. See condition (9).
(I) Spark plug is partially shorted (fouled, cracked, or broken). See condition (10).
(J) Spark plug is shorted (fouled, cracked, or broken, etc.). See condition (11).

It will therefore be seen that with these aids to operation, troubles in the ignition system which are indicated upon making the tests, may be readily identified, and the necessary remedies or repairs made.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for testing the ignition system of an internal combustion engine including circuit means connected to the distributor and to the spark plugs of the system, two pairs of spaced electrodes forming independent spark gaps, switch means for alternately including one pair of electrodes in circuit with the ignition system independent of the plugs and including the other pair of electrodes in circuit with the ignition system to include the plugs, and additional switch means to selectively include the circuit for any plug with said first named switch means.

2. A device for testing the ignition system of an internal combustion engine including circuit means connected to the distributor and to the spark plugs of the system, spaced electrodes forming a spark gap included in the device, means including a rotatable switch to connect any of the plug-circuits in circuit with the electrodes, and, adjustable stop means for controlling the rotation of the switch to the extent necessary to selectively connect any plug circuit with the electrodes.

3. A device for testing the ignition system of an internal combustion engine including circuit means connected to the distributor and to the spark plugs of the system, spaced electrodes forming a spark gap included in the device, a switch for selectively shunting the current from the distributor to the electrodes and to enable the current to flow through the plug, and an additional switch for selectively including any plug in connection with the first named switch.

4. A device for testing the ignition system of an internal combustion engine including circuit means connected to the distributor and to the spark plugs of the system, a pair of adjustable spark gaps in the circuit means, a switch for alternately including either spark gap in the circuit means, and a second switch for selectively shunting the current from any distributor wire in the circuit means to the first switch while maintaining the other distributor wires in connection with their respective plugs.

5. A structure as in claim 4, in which means is included with the first named switch for enabling the current passing thereto from any selected wire of the second switch to flow to the corresponding plug regardless of the setting of said second switch.

6. A structure as in claim 2, in which said adjustable stop means comprises an arm fixed with and disposed radially of the switch, and removable keys mounted in the path of movement of the arm.

In testimony whereof I affix my signature.

WALTER K. HACK.